United States Patent [19]
Mikael et al.

[11] Patent Number: 5,259,296
[45] Date of Patent: Nov. 9, 1993

[54] BREWING APPARATUS

[75] Inventors: Torma Mikael, Gunzgen; Anton Ackermann, Wolfwil, both of Switzerland

[73] Assignee: Jura Elektroapparate AG, Niederbuchsiten, Switzerland

[21] Appl. No.: 25,138

[22] Filed: Mar. 2, 1993

[30] Foreign Application Priority Data

Mar. 2, 1992 [CH] Switzerland ............... 639/92

[51] Int. Cl.$^5$ ............................................. A47J 31/34
[52] U.S. Cl. ........................................ 99/280; 99/286; 99/287; 99/289 R; 99/302 P
[58] Field of Search ............... 99/280, 281, 282, 283, 99/286, 287, 289 R, 297, 299, 300, 302 R, 302 P; 426/433

[56] References Cited

U.S. PATENT DOCUMENTS

| | | | |
|---|---|---|---|
| 4,188,863 | 2/1980 | Grossi | 99/289 R |
| 4,681,028 | 7/1987 | Schmed | 99/289 R |
| 4,797,296 | 1/1989 | Meier | 99/302 P |
| 4,993,315 | 2/1991 | Huber | 99/289 R |

*Primary Examiner*—Robert W. Jenkins

*Attorney, Agent, or Firm*—Oblon, Spivak, McClelland, Maier & Neustadt

[57] ABSTRACT

The brewing apparatus (2) comprises lateral guiding and holding plates (6, 7) for securing and guiding individual components thereof. A movable brewing piston (39) is guided in a cylindrical guideway (8) provided with an external thread (93). A nut (9) rotatable on the guideway has teeth (10) at its periphery and is moved on the guideway by a motor-driven, elongated gearwheel (11). Lateral guide arms (14, 15) engage the nut and the brewing piston and control the pivoting movement of a brewing cylinder (82). The brewing cylinder has two arms provided with teeth (86, 87), these arms co-operating with a drive part (26) for moving an ejection piston (107) in the brewing cylinder. The drive part for the ejection piston is designed in such a way that it travels only half as far as the ejection piston and thus allows the coffee machine to have less headroom. The displacement of the brewing piston, and hence its brewing position, is electronically detected and makes possible an exact determination of the variable brewing volume, thus optimum adaptation of the brewing chamber to the preselected amount of ground coffee. The drive disposed concentrically with the axis of the brewing piston prevents tilting of the drive facility.

23 Claims, 13 Drawing Sheets

BREWING APPARATUS

This invention relates to equipment for brewing beverages, and more particularly to brewing apparatus, especially for a coffee machine, of the type having lateral guiding and holding plates with grooves for guiding a brewing cylinder and for mounting individual components of the brewing apparatus, a brewing piston, a brewing cylinder having an ejection piston, supply parts for supplying scalding water to the brewing cylinder, and discharge parts for the prepared beverage. The invention further relates to a coffee machine equipped with a brewing apparatus.

Apparatus for preparing hot beverages, especially coffee, is disclosed in U.S. Pat. No. 4,681,028. A drawback of this apparatus is that the brewing chamber space for receiving the beverage powder or grounds has no variable volume, so that this apparatus is not suitable for optimum brewing of portions of coffee with varying amounts of ground coffee. If a greater brewing volume were chosen for this apparatus, a greater eccentric would have to be used as well, and thus the equipment as a whole would take on large dimensions as regards width and height.

French Published Patent Application No. 2,424,101 describes a coffee machine in which grooves are provided in lateral plates for guiding journals of a tiltable and displaceable brewing chamber arrangement. A drawback of this apparatus is that it requires considerable headroom.

Disclosed in U.S. Pat. No. 4,993,315 is a coffee machine in which a geared engine is provided for vertical axial displacement of the brewing piston and for swiveling of the cylinder-piston unit. A drawback of this apparatus is that because separate motors are used for the axial movement of the piston and the swivel movement of the cylinder-piston unit, it is expensive, complicated, and bulky.

It is an object of this invention to provide an improved brewing apparatus and coffee machine which avoid the drawbacks of the prior art.

A further object of this invention is to provide brewing apparatus having a variable brewing chamber volume corresponding to the preselected amount of ground coffee in order to make possible an optimum brewing operation with any preselectable amount of ground coffee.

Another object of this invention is to provide a coffee machine having reduced headroom as compared with prior art machines.

Still another object of this invention is to provide a coffee machine wherein the drive for the axial movement of the brewing piston and for the swiveling movement of the brewing cylinder of the brewing apparatus taking place in such a way that no tilting of the drive means can occur.

To this end, the brewing apparatus according to the present invention, of the type initially mentioned, comprises a guide part disposed concentrically with the brewing piston for axial guidance of the brewing piston, first drive means disposed concentrically with this guide part in order to bring the brewing piston into the desired brewing position variable with respect to the brewing cylinder, the drive means being connected to control elements for controlling the swivel movement of the brewing cylinder from a filling position into a brewing position, and a driving part movable with respect to the brewing cylinder for moving the ejection piston in the brewing cylinder in such a way that the ejection piston travels a step-up geared path with respect to the driving part.

The coffee machine according to the present invention is equipped with the foregoing brewing apparatus.

In one embodiment of the coffee machine, means are provided for detecting the revolutions of first drive means of the brewing apparatus and thereby determining the position of the brewing piston. Furthermore, the coffee machine is preferably designed to comprise a control unit which determines the grinding time of a grinder on the basis of preselected parameters. The signal transmitted to the control unit by the means for determining the position of the brewing piston serves to correct the grinding time based, for example, upon wear and tear on the grinder.

Preferred embodiments of the invention and their use will now be described in detail with reference to the accompanying drawings, in which.

Figure 1:
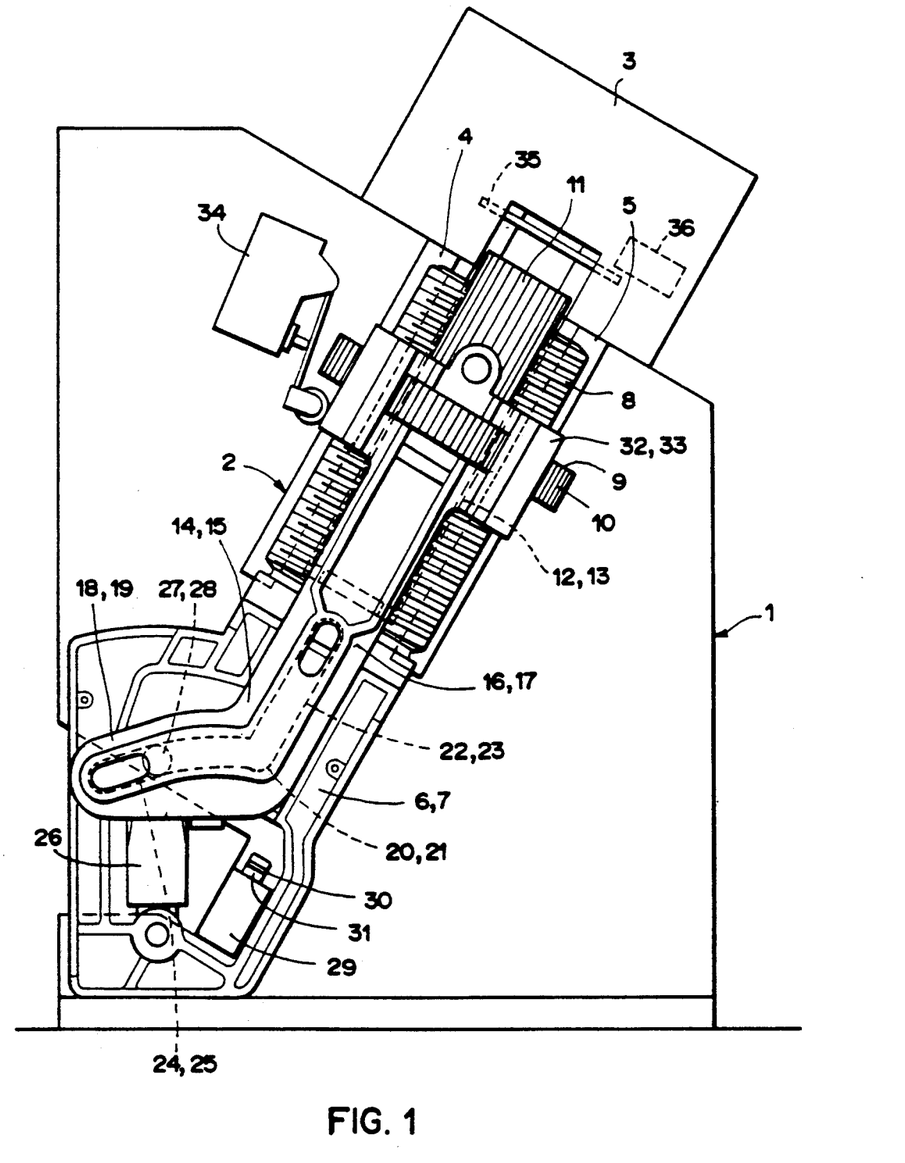
FIG. 1 is a diagrammatic elevation of brewing apparatus mounted on a coffee machine.

FIG. 1 shows in elevation a brewing apparatus 2, forming part of a diagrammatically illustrated coffee machine 1, with cover plates removed. Besides brewing apparatus 2, coffee machine 1 comprises further components (not shown), such as a supply tank for cold water, a heating unit for heating the cold water, a feed pump for feeding the heated water to brewing apparatus 2, a grinder for coffee beans, a motor for driving brewing apparatus 2, and control and regulating facilities. The motor for driving brewing apparatus 2 is contained in a diagrammatically illustrated part 3 of coffee machine 1. Brewing apparatus 2 is secured in coffee machine 1 by means of diagrammatically illustrated fastening means 4 and 5. Brewing apparatus 2 comprises lateral holding and guiding plates 6 and 7 connected to a cylindrical, externally threaded guideway 8 for the axial displacement of a brewing piston (not shown in FIG. 1).

Set on cylindrical guideway 8 concentrically therewith is a nut 9 provided with an internal thread matching the external thread of cylindrical guideway 8 acting like a screw. Nut 9 is provided on its outside periphery with gear-teeth 10 and acts additionally as a gearwheel. By means of a cylindrical gearwheel 11 having a large length/diameter ratio, nut 9 is rotated and thereby moves axially along guideway 8 for the brewing piston. In the present instance, the gear ratio is 3.8:1. Gearwheel 11 is driven by a motor (not shown) disposed in part 3 of coffee machine 1.

Guideway 8 for the brewing piston is only part-cylindrical inasmuch as two oppositely disposed cut-outs 12 and 13 extend over its entire length parallel to the axis. Parallel to cut-outs 12 and 13, two guide arms 14 and 15 are disposed opposite one another outside of cylindrical guideway 8. Arms 14 and 15 pass through cover plates (not shown). Upper portions 16 and 17 of arms 14 and 15 run parallel to the longitudinal axis of guideway 8, while their lower portions 18 and 19 bend at an angle of about 130° relative to upper portions 16 and 17. The sides of arms 14 and 15 facing guideway 8 are provided with grooves 20 and 21 running along the same angle as portions 16, 17 and 18, 19, respectively, of guide arms 14 and 15. Upper portions 22 and 13 of grooves 20 and 21 are straight and run parallel to the axis of cylindrical guideway 8, whereas lower portions 24 and 25 of grooves 20 and 21 are bent. Drive means 26 for moving an ejection piston in a brewing cylinder are guided in grooves 20 and 21 of guide arms 14 and 15 by means of laterally projecting journals 27 and 28 on one side.

Situated in the lower region of lateral guiding and holding plates 6 and 7 is a scalding water connection 29 having a valve and, in brewing position, engaging a corresponding bottom fitting on the brewing cylinder by means of a cylindrical plug 31 provided with a gasket 30. At the end of the brewing operation, the valve opens and allows the remaining water to run off, thus yielding a clean brewing chamber and a dry cake of coffee grounds. The upper ends 32 and 33 of guide arms 14 and 15 are connected to the brewing piston, which is not visible in FIG. 1. When nut 9 moves down on cylindrical guideway 8, a switch 34 is actuated which determines the ground-coffee filling position when the stroke of the brewing piston is not monitored electronically. A disk-shaped means 35 secured at the top of the shaft of gearwheel 11 and a sensor 36 form an incremental transmitter for detecting the number of revolutions and partial revolutions made by gearwheel 11 and thus the axial position of the brewing piston. A linear potentiometer connected to the brewing piston might also be used, for example.

Figure 2:
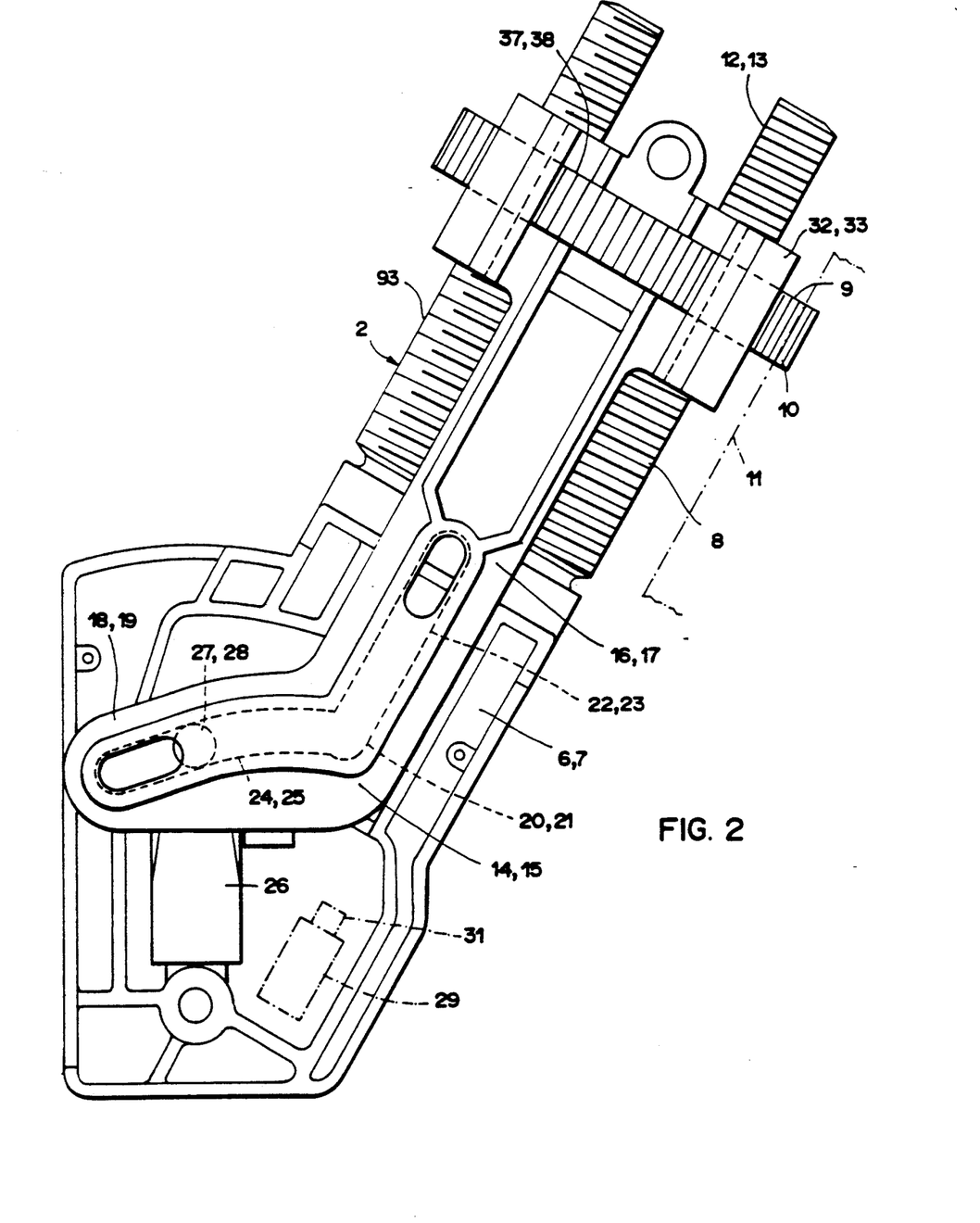
FIG. 2 is an elevation of the brewing apparatus with lateral cover plates removed.

In FIG. 2, brewing apparatus 2 is shown in elevation on a larger scale. Guide arms 14 and 15 are in the ground-coffee filling position. Upper portions 32 and 33 of lateral guide arms 14 and 15 are detachably connected to the brewing piston (not shown) guided in cylindrical guideway 8. Gear-teeth 10 of nut 9 engage recesses 37 and 38 in upper portions 32 and 33 of guide arms 14 and 15, so that as nut 9 moves axially, arms 14 and 15 likewise carry out an axial movement together with the brewing cylinder attached thereto.

Figure 3:
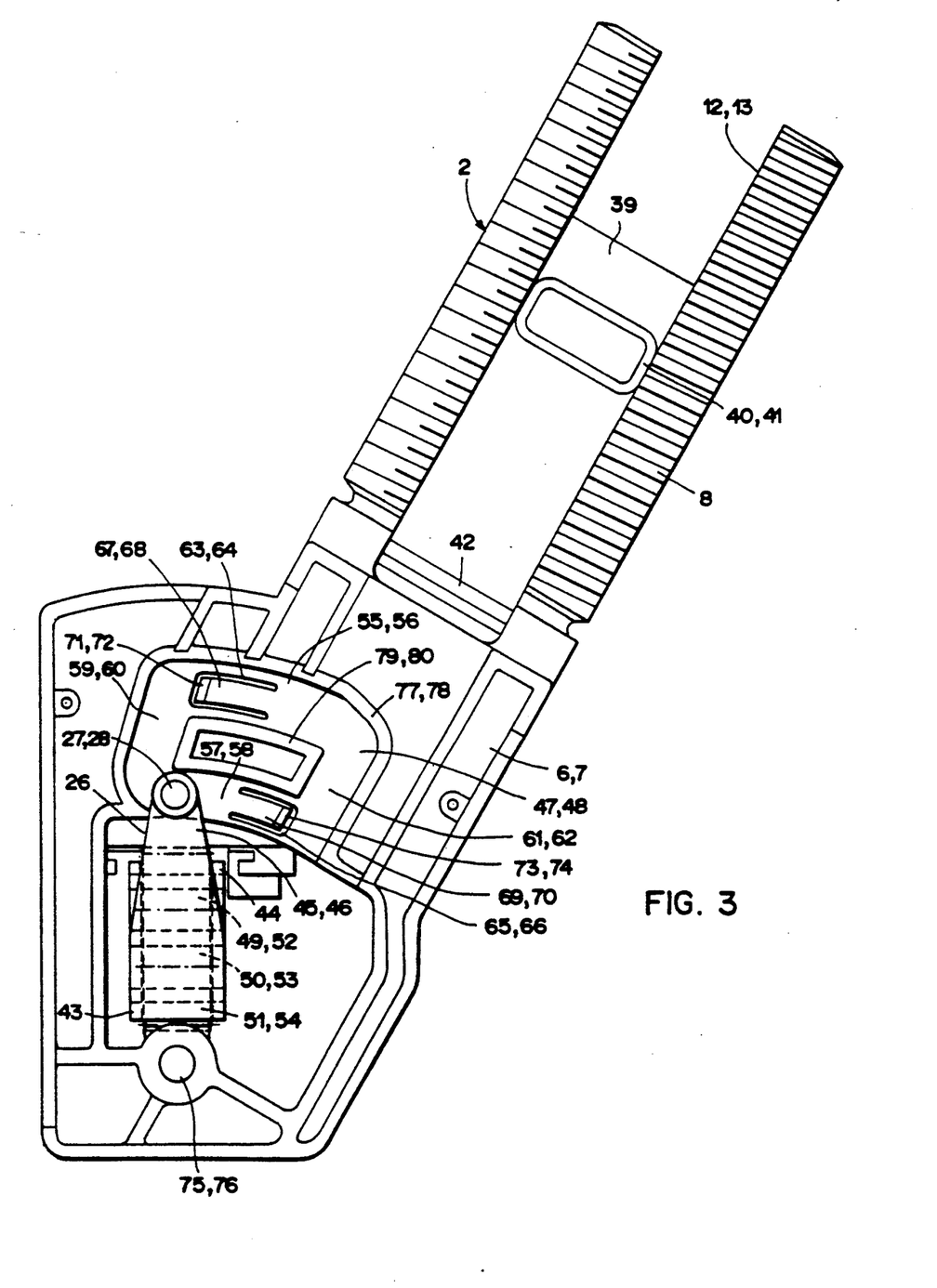
FIG. 3 is an elevation of the brewing apparatus partially disassembled.

FIG. 3 is an elevation of brewing apparatus 2 from which guide arms 14 and 15 and nut 9 have been omitted. A brewing piston 39 guided in cylindrical guideway 8 includes rectangular sidepieces 40, 41 which are engaged by corresponding lugs affixed to guide arms 14, 15 in the upper regions thereof. The lower part of brewing piston 39 is provided with a gasket 42. Drive means 26 for moving an ejection piston up and down in the brewing cylinder comprises plates 43 and 44 disposed perpendicular to lateral guiding and holding plates 6, 7. Plates 43 and 44 are joined at the sides to sideplates 45 and 46, attached to the tops of which are guiding journals 27 and 28. The outer sides of journals 27 and 28 engage grooves 20 and 21 of guide arms 14 and 15, while the inner sides engage parallelogram-shaped guide grooves 47 and 48 in plates 6 and 7. Disposed one above the other between plates 43 and 44, at each side thereof, are three pinions 49, 50, 51 and 52, 53, 54, respectively, the spindles of these pinions being secured in plates 43 and 44.

Guide grooves 47 and 48 each have longer upper and lower portions 55, 56 and 57, 58, respectively, and shorter side portions 59, 60 and 61, 62, respectively. Portions 55, 56 and 57, 58 of grooves 47, 48 include diagonally offset, U-shaped recesses 63, 64 and 65, 66 at each side. By means of these recesses, resilient groove parts 67, 68 are formed in upper portions 55, 56 of guide grooves 57, 58, and resilient groove parts 69, 70 in lower groove portions 57, 58. The free outer ends of these resilient groove parts are provided with lugs 71, 72 and 73, 74, respectively, projecting into grooves 47, 48. When lateral guide arms 14, 15 move up and down, and journals 27, 28 are thereby compelled by guide grooves 20, 21 in guide arms 14, 15 to move in guide grooves 47, 48, journals 27, 28 are kept from moving backward in grooves 47, 48 by lugs 71, 72 and 73, 74, respectively.

Near the bottom of lateral guiding and holding plates 6, 7 are holes 75, 76 for mounting a shaft extending through the lower parts of driving arms of the brewing cylinder (not visible in FIG. 3). Guide grooves 47, 48 are bounded outwardly by rims 77, 78 and inwardly by rims 79, 80.

Since brewing piston 39 is driven as described by nut 9 disposed concentrically with the longitudinal axis of the brewing piston, there can be no tilting of the drive means, which might take place if an axial drive were disposed at the side of the brewing piston or the brewing cylinder.

Figure 4:
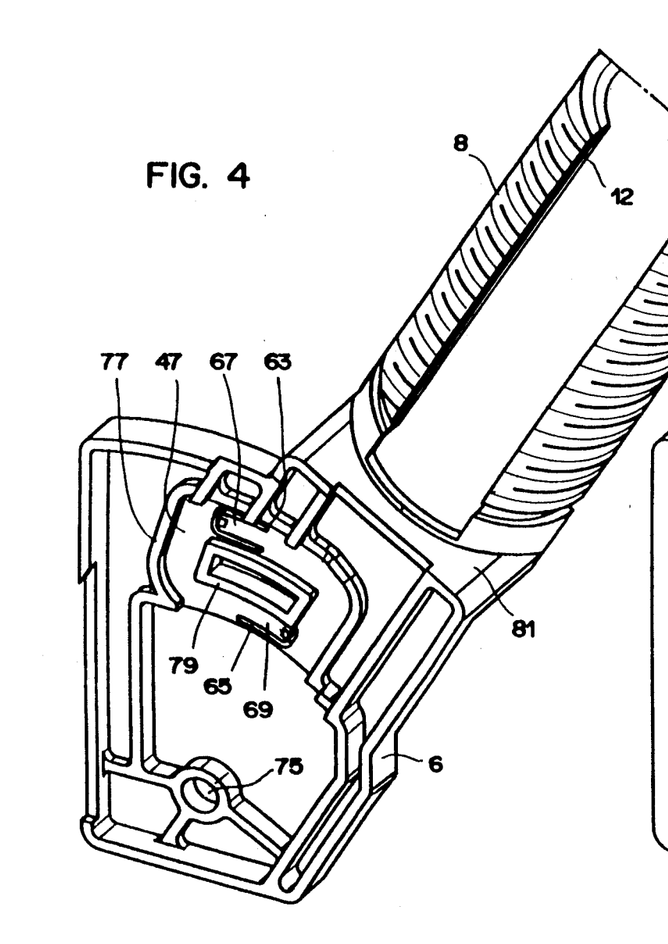
FIG. 4 is a perspective view in section of a lateral guiding and holding plate of the brewing apparatus with a guideway for a brewing piston.
Figure 5:
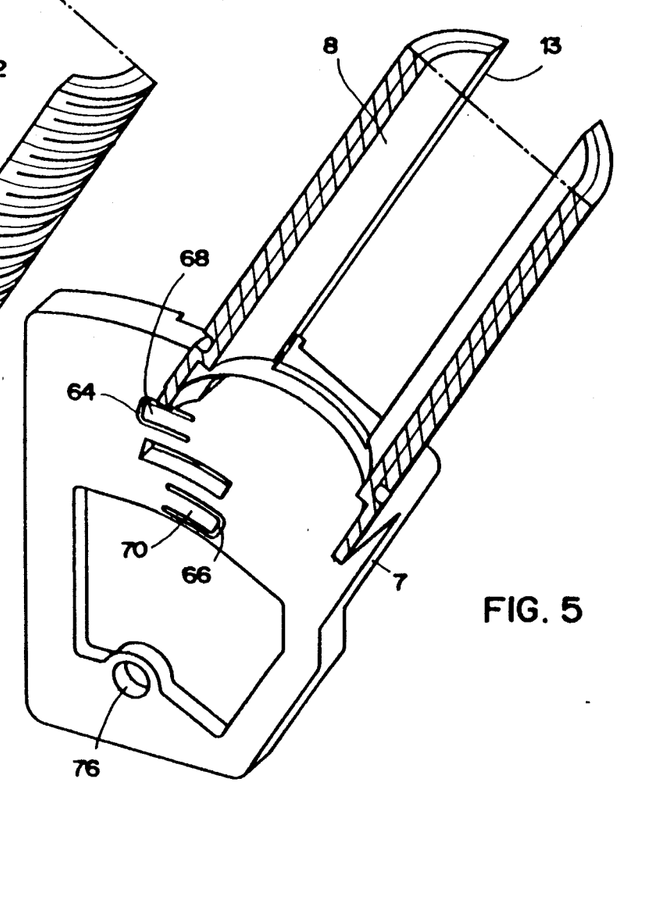
FIG. 5 is a perspective view in section of another lateral guiding and holding plate of the brewing apparatus with the guideway for the brewing piston.

FIGS. 4 and 5 illustrate, in perspective and cut along a plane running through the longitudinal axis, lateral guiding and holding plates 6, 7 with cylindrical guideway 8 for the brewing piston joined thereto. Plates 6, 7 are connected at the top by a perpendicularly disposed connection part 81.

Figure 6:
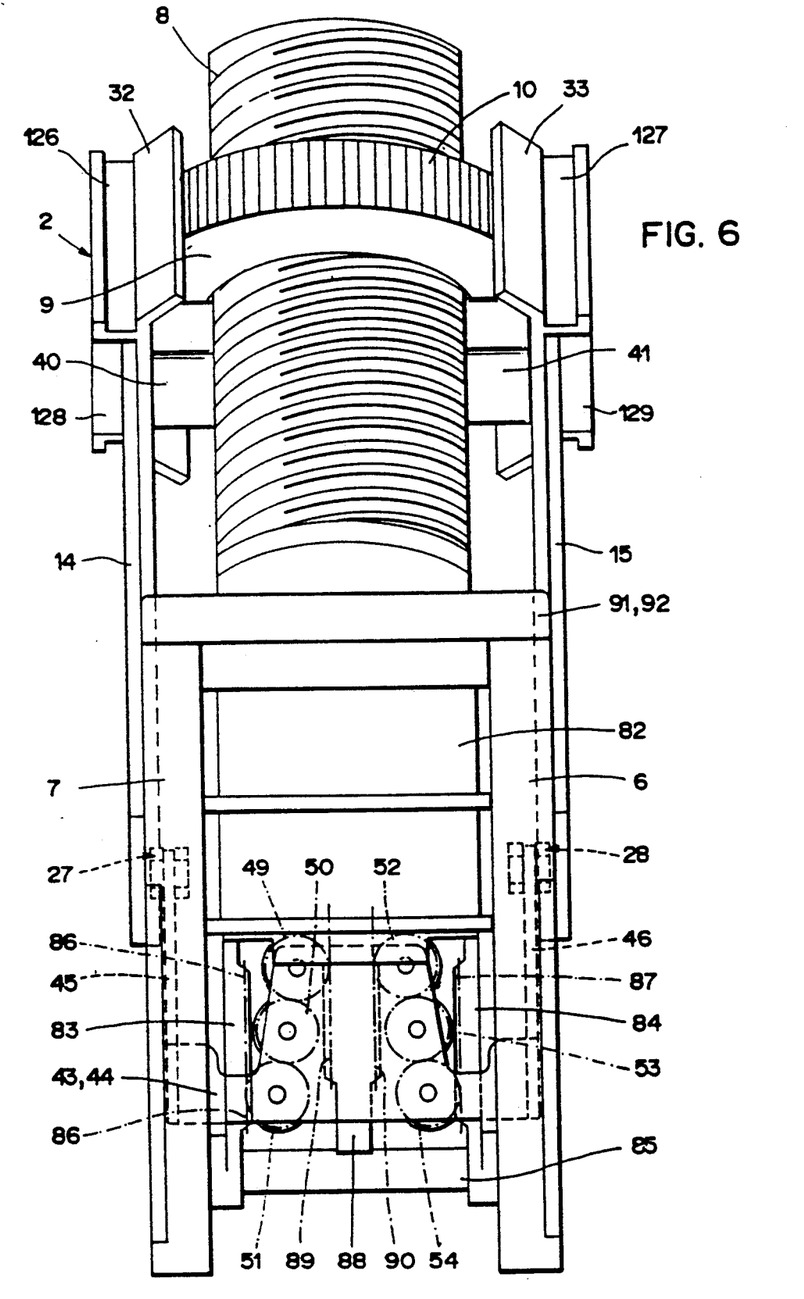
FIG. 6 is a front elevation of the brewing apparatus.

FIG. 6 is a perspective front elevation of brewing apparatus 2, a brewing cylinder 82 being in the ground-coffee filling position as in FIGS. 1 to 3. At the bottom, brewing cylinder 82 is connected to downwardly projecting, opposite driving and securing arms 83 and 84. These arms are provided on the inside with teeth and are pivotingly mounted on a shaft 85 held in holes 75 and 76 (FIGS. 4 and 5) of lateral guiding and holding plates 6 and 7. The bottom pinions 51 and 54 mounted between plates 43 and 44 mesh with driving arms 83 and 84 disposed opposite the pinions and acting as racks. The top pinions 49 and 52 mesh with a double rack 88, provided on both sides with teeth 89 and 90, which acts as the bottom appendage of an ejection piston. Upper ends 32 and 33 of guide arms 14, 15 are provided with lateral tracks 126, 127, 128, and 129 engaging fastening means 4 and 5 of the coffee machine. Lateral guiding and holding plates 6 and 7 are connected at the top by lateral crosspieces 91 and 92 disposed perpendicular thereto.

Figure 7:
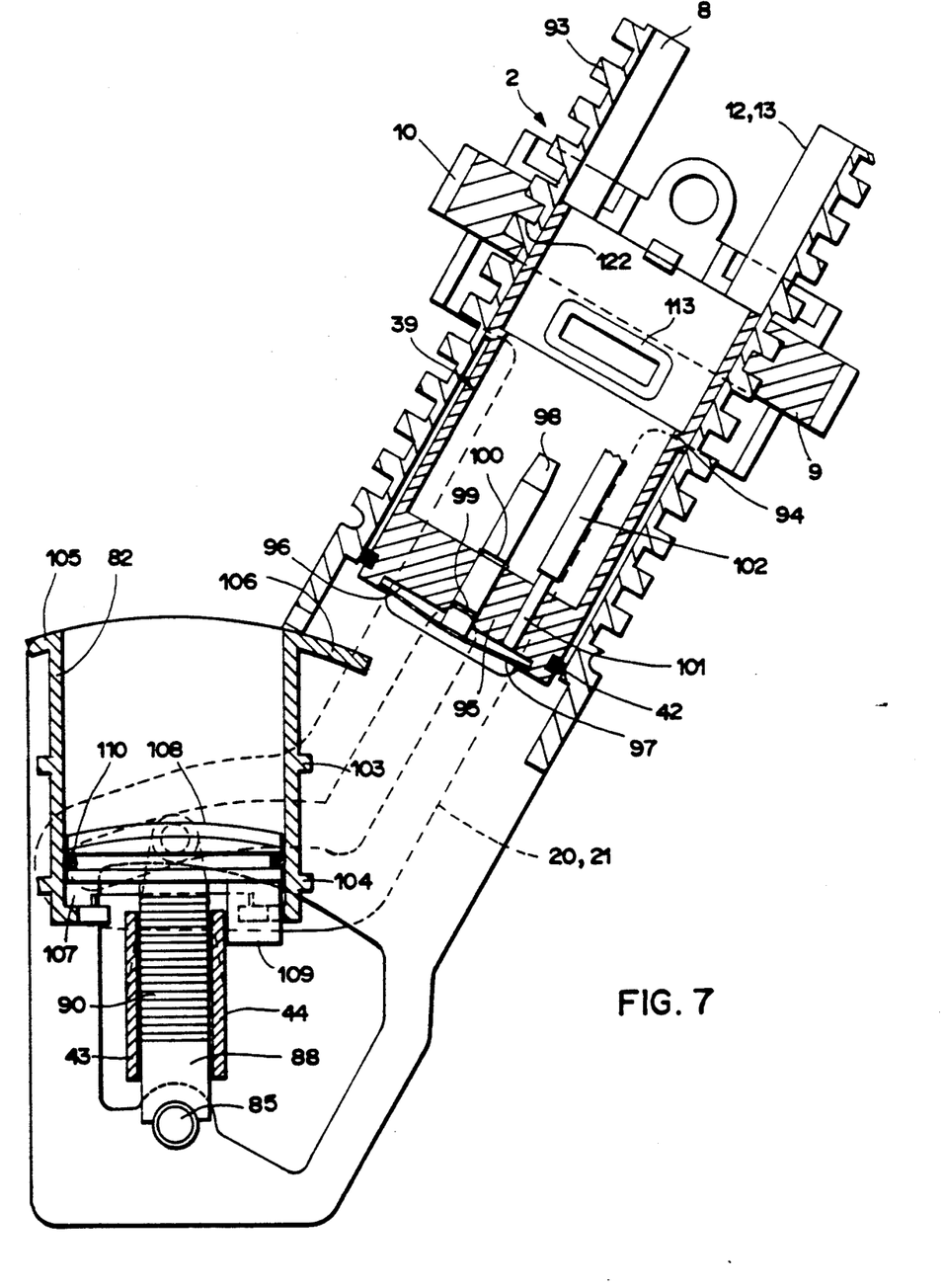
FIG. 7 is a longitudinal section through the brewing apparatus with a brewing cylinder in filling position.

FIG. 7 is a longitudinal section through brewing apparatus 2 with brewing cylinder 82 in the ground-coffee filling position. A thread 93 of cylindrical guideway 8 for brewing piston 39 is shown in this drawing figure. Brewing piston 39 comprises a hollow cylindrical part 94 and a frontal part 95 disposed at the bottom. Attached to the end face 96 of frontal part 95 is a strainer plate 97 which can be pushed out of part 95 for cleaning by means of a pin 98 provided with a gasket 99 and a circlip 100. Disposed in frontal part 95 and connected to tubing 102 is a pipe 101 having an aperture for discharging the coffee. In the middle and near the bottom, brewing cylinder 82 includes outwardly protruding, circular ribs 103 and 104, respectively. At the top, brewing cylinder 82 is provided with a curved closure plate 105 having a circular opening, the end of plate 105 nearest brewing piston 39 including an extension 106.

Movable up and down within brewing cylinder 82 is an ejection piston 107 from which appendage 88, provided on each side with teeth 89 and 90, projects downward. At the top, ejection piston 107 is provided with an arcuate rib 108 partially formed as a pipe and connected to a scalding water fitting 109. Ejection piston 107, which is also provided with a gasket 110, does not yet rest at the bottom on support surfaces 130, 131 (FIG. 8) of brewing cylinder 82 in order not to collide with scalding water connection 29 of the coffee machine upon pivoting of brewing cylinder 82.

Figure 8:
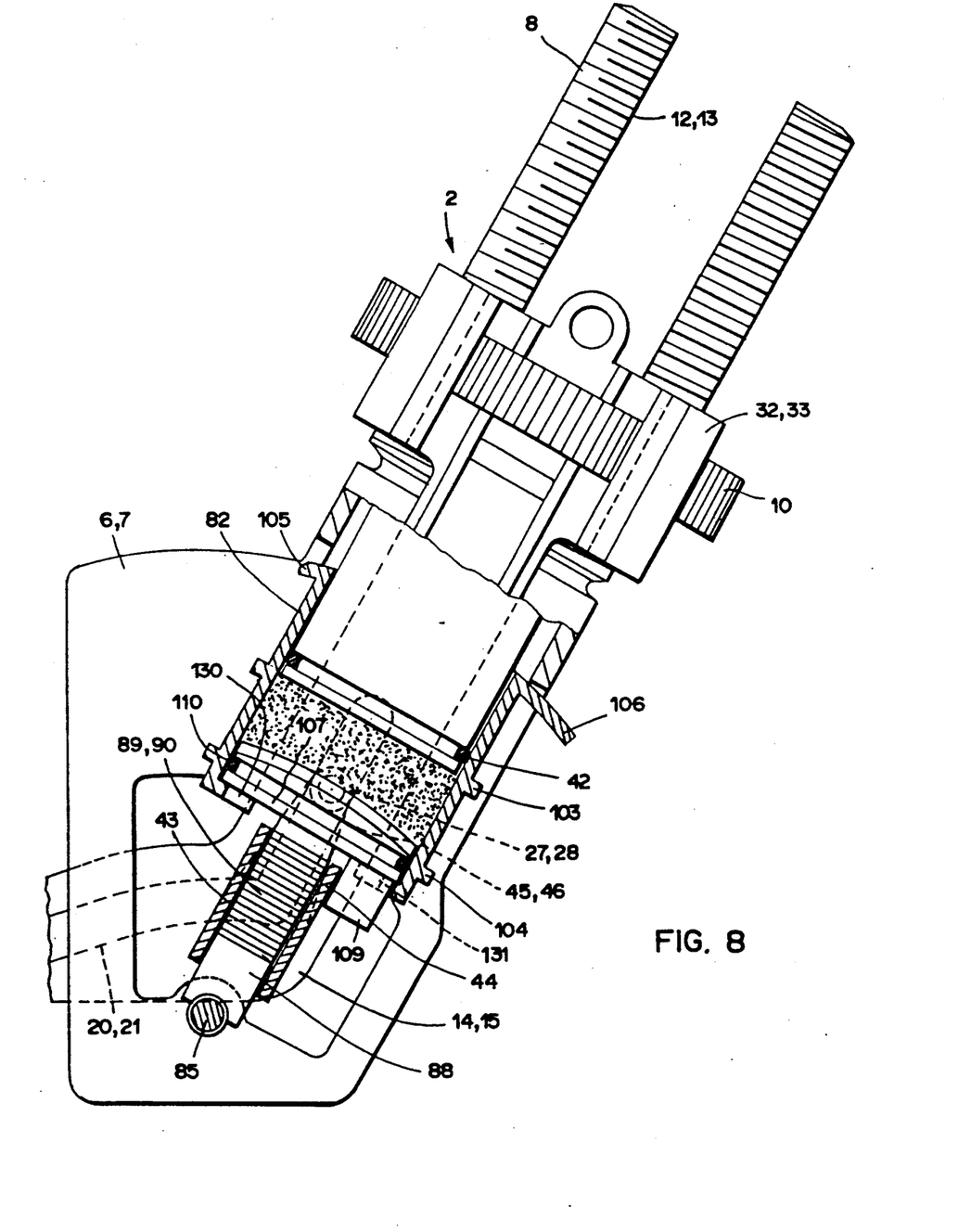
FIG. 8 is an elevation of the brewing apparatus, partially in section, with the brewing cylinder in brewing position.

FIG. 8, an elevation of brewing apparatus 2 partially in section, shows brewing cylinder 82 in brewing position. The bottom of ejection piston 107 is resting upon support surfaces 130, 131 of brewing cylinder 82, and scalding water fitting 109 of ejection piston 107 becomes operatively connected to scalding water connection 29 of the coffee machine.

Figure 9:
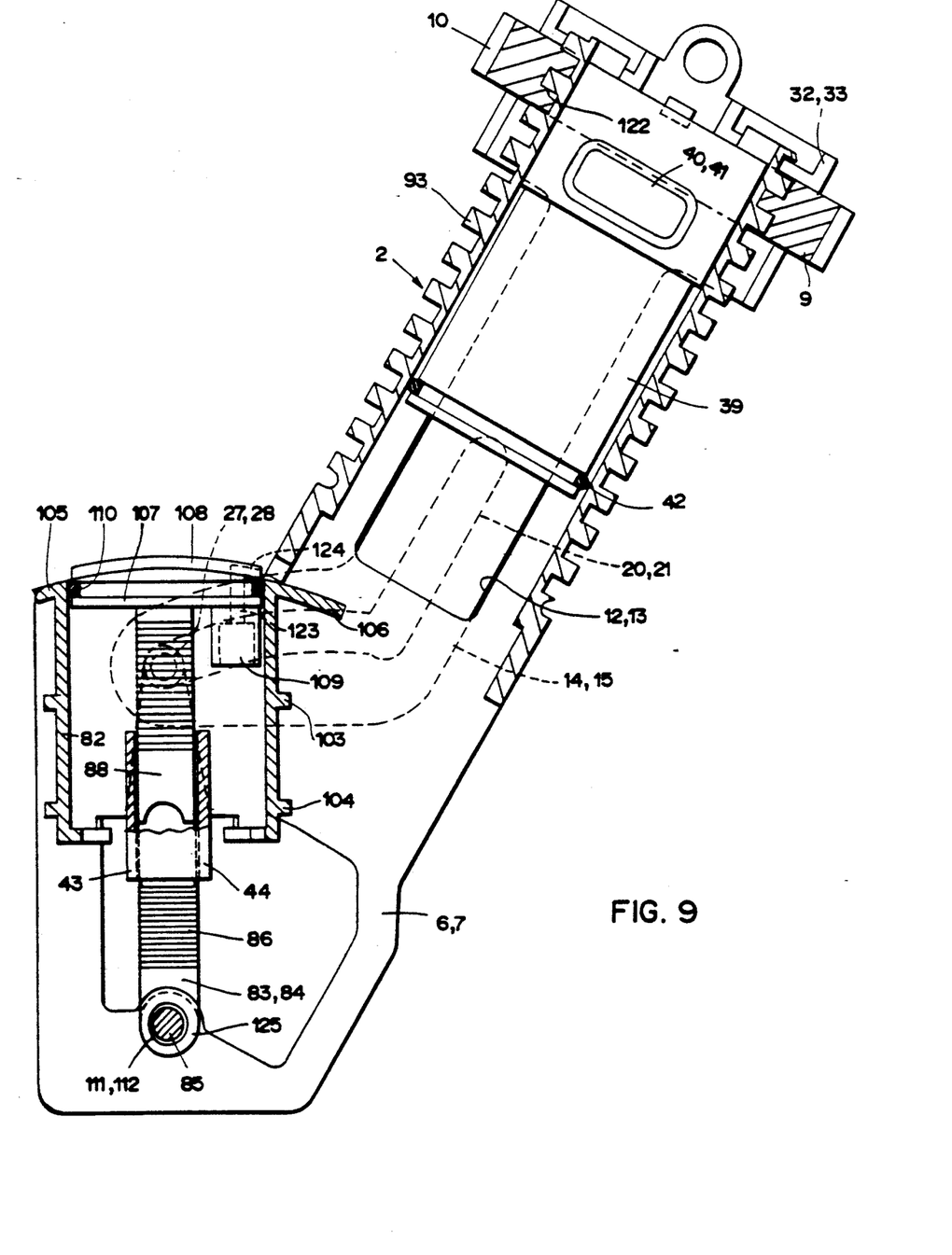
FIG. 9 is a longitudinal section through the brewing apparatus with the brewing cylinder in ejection position.

In FIG. 9, a longitudinal section through brewing apparatus 2, brewing cylinder 82 is in ejection position. During the transition from the brewing position of FIG. 8 to the ejection position of FIG. 9, the cake of coffee grounds is stripped off closure plate 105 by ejection piston 107 over extension 106 on brewing cylinder 82 toward brewing piston 39 and drops into a recipient of coffee machine 1 intended for that purpose. Driving arms 83 and 84 of brewing cylinder 82 have respective holes 111 and 112 at the bottom for the passage of shaft 85 secured in lateral guiding and holding plates 6 and 7. Between arms 83 and 84 of brewing cylinder 82, in the vicinity of holes 111 and 112, a bush 125 is disposed on shaft 85. Scalding water fitting 109 secured to ejection piston 107 is connected to a supply line 123 which opens out into a bore 124 in rib 108. The scalding water is distributed on the wall of brewing cylinder 82.

Figure 10:
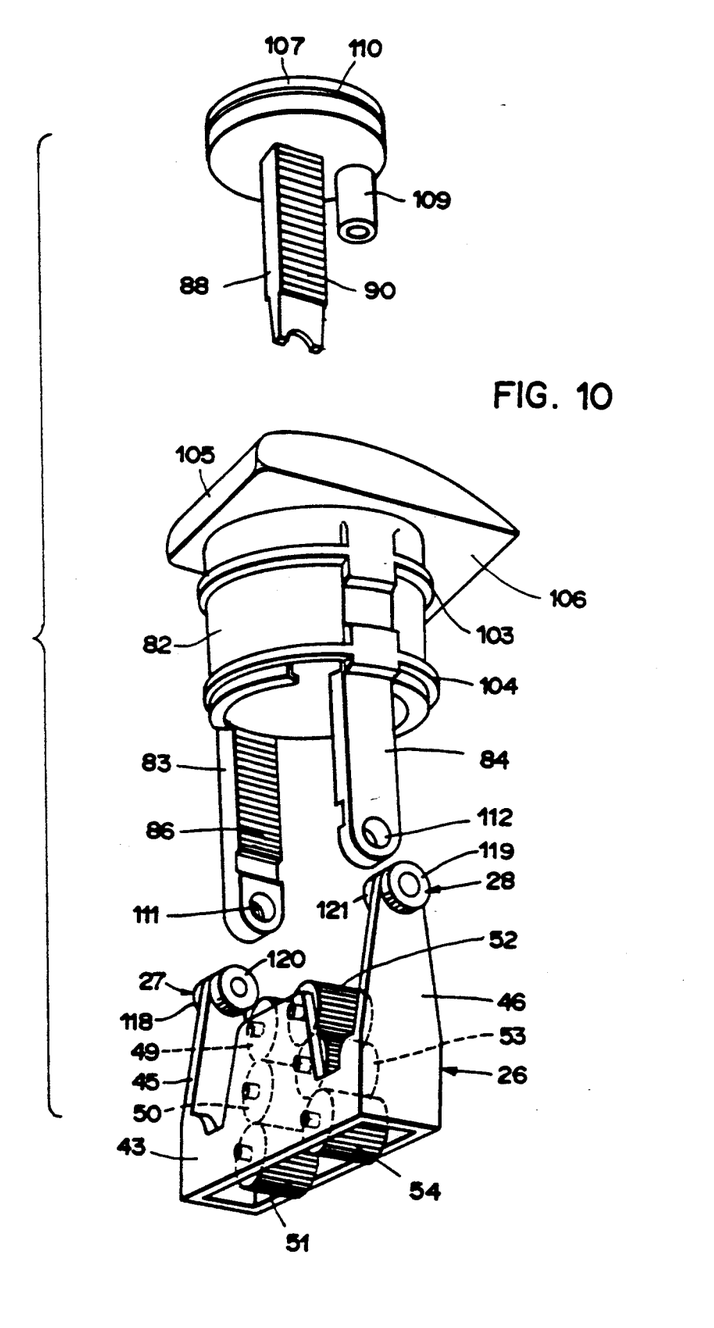
FIG. 10 is an exploded perspective view of the brewing cylinder with an ejection piston and drive means therefor.

FIG. 10 illustrates in an exploded perspective view brewing cylinder 82, ejection piston 107, and drive means 26 for moving ejection piston 107 up and down in brewing cylinder 82. Journals 27 and 28 have outwardly projecting parts 118, 119 and inwardly projecting parts 120, 121

Figure 11:
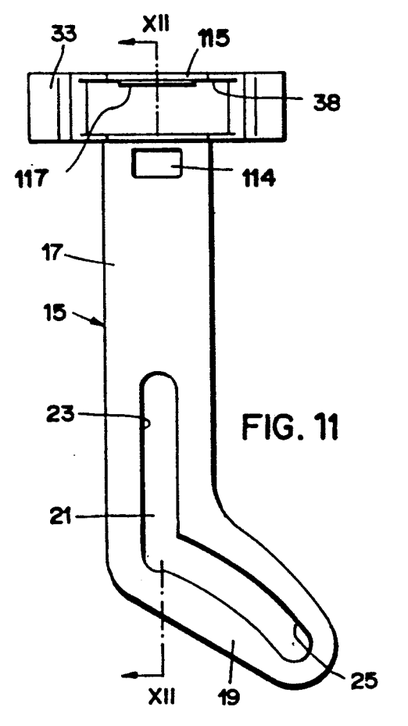
FIG. 11 is a top plan view of a lateral guide arm.
Figure 12:
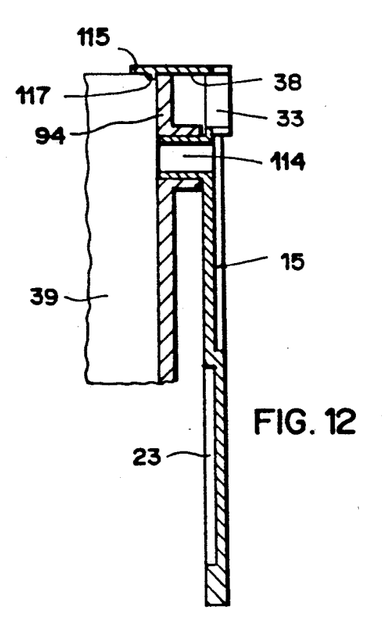
FIG. 12 is a section taken on the line XII—XII of FIG. 11.

FIG. 11 is a top plan view of guide arm 15, while FIG. 12 is a section through arm 15 taken on the line XII—XII of FIG. 11, particularly illustrating a lug 114, rectangular in cross-section, which engages the rectangular sidepiece 41 on brewing piston 39 shown in FIG. 3. A horizontal overhang 115 on guide arm 15 with a downwardly projecting rib 117 forms a snap closure with the wall of hollow cylindrical part 94 of brewing piston 39.

Figure 13:
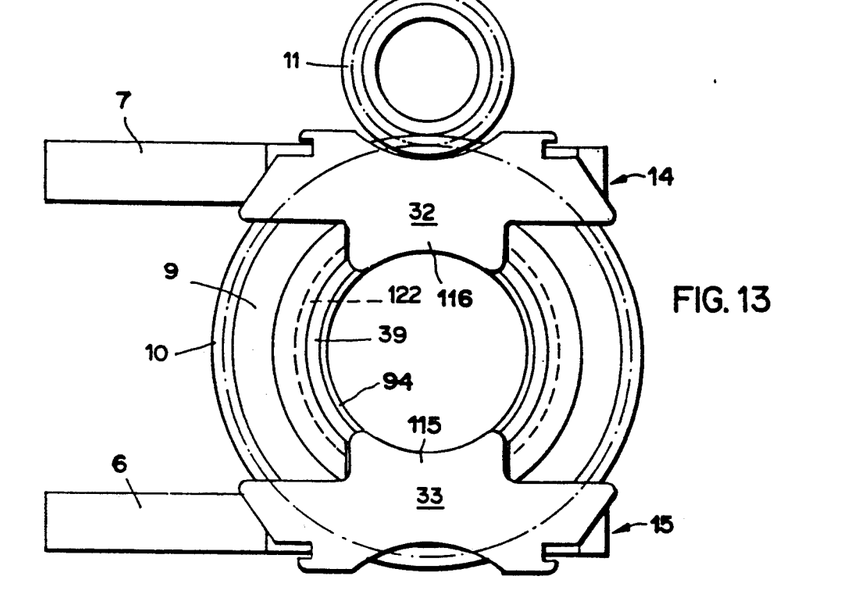
FIG. 13 is a top plan view of the brewing apparatus.

FIG. 13, a top plan view of brewing apparatus 2, shows as an addition to FIG. 12 the other guide arm 14, which is likewise provided with an upper horizontal overhang 116 to form a snap closure with brewing piston 39.

Figure 14:
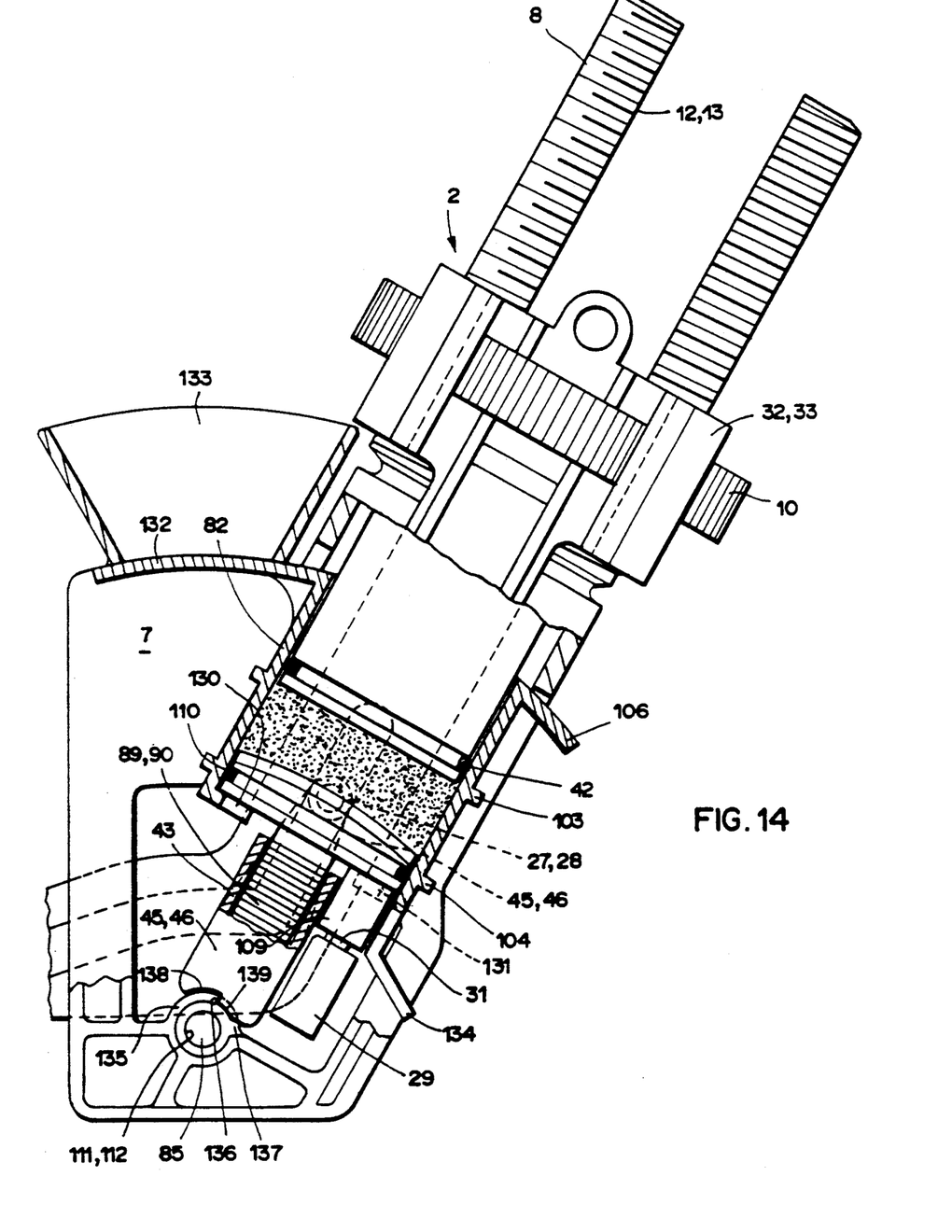
FIG. 14 is an elevation, partially in section, of another embodiment of the brewing apparatus.

The brewing apparatus shown in FIG. 14, partially in section, is supplemented by additional parts as compared with the brewing apparatus described above. The parts which are the same as in the earlier embodiment are designated by the same reference numerals. Closure plate 105 in this embodiment is extended toward the left, as viewed in FIG. 14, by a part 132. Above part 132, i.e., above brewing cylinder 82 in filling position, there is a hopper 133 for the ground coffee. Hopper 133 may be attached to brewing apparatus 2 itself or to holding means on the coffee machine. In the brewing position of brewing cylinder 82 shown in FIG. 14, hopper 133 is closed at the bottom by extension part 132. This embodiment has the advantage that when a number of portions of coffee are to be brewed in succession, a grinding operation may already take place during the brewing operation, thus saving time and allowing several portions of coffee to be prepared successively within a shorter period.

Brewing cylinder 82 is provided with a cover plate 134 on the side adjacent to scalding water fitting 109. Cover plate 134 prevents coffee residue from getting into scalding water connection 29, 30 and possibly clogging it when the cake of coffee grounds is pushed away along extension 106.

Figure 15:
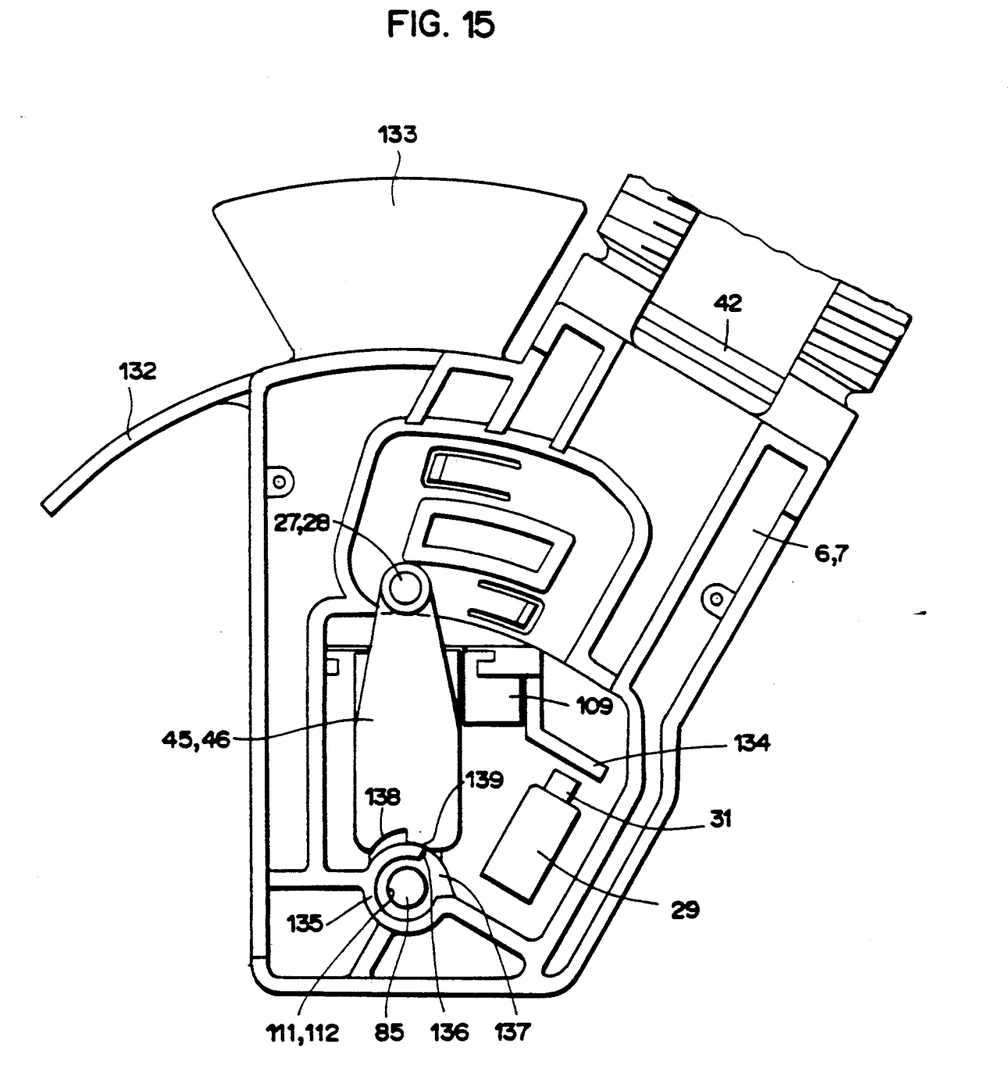
FIG. 15 is an elevation of the lower part of the brewing apparatus of FIG. 14.

FIG. 15 shows the lower part of the brewing apparatus of FIG. 14 in elevation, brewing cylinder 82 being in ejection position. Cover plate 134 protects scalding water connection 29, 31 from soiling. Holes 111, 112 for mounting shaft 85 in sideplates 6, 7 are encircled by a raised area 135 having a shoulder 136 and by a sunken area 137. The ends of sideplates 45, 46 of drive means 26 include two mutually staggered areas 138 and 139. As a result, when the brewing cylinder is pivoted from the ground-coffee filling position into brewing position, drive means 26, and hence ejection piston 107 with scalding water fitting 109 as well, is moved downward somewhat, thus enabling scalding water fitting 109 of ejection piston 107 to be brought into engagement with plug 31 of scalding water connection 29 of the coffee machine.

Figure 16:
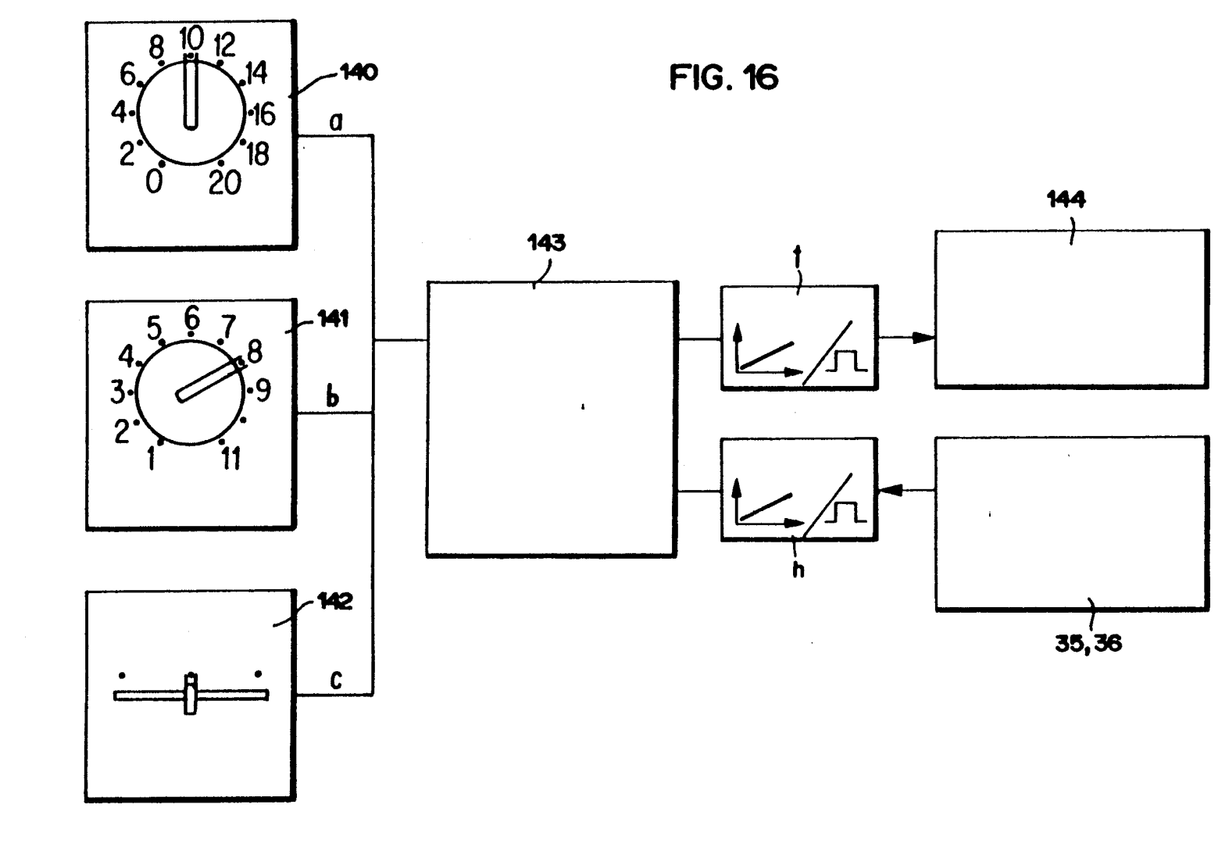
FIG. 16 is a block diagram of an arrangement for controlling the amount of ground coffee and for monitoring the stroke of the brewing piston.

FIG. 16 is a block diagram of means for controlling the amount of ground coffee and for monitoring the stroke of the brewing piston. It comprises an input unit 140 for preselection of the desired volume of coffee to be ground, an input unit 141 for setting the fineness of grind, and an input unit 142 for preselection of the mixture of coffee beans, the ratio when the slide is in the middle being 50%–50%. Data a, b, and c of input units 140, 141, and 142 are supplied to a control unit 143. From data a, b, and c, plus a correction factor k, the grinding time is calculated, a corresponding signal t being supplied to a grinder 144. When there has not yet been any wear and tear on grinder 144, the grinding time corresponds to a certain amount of ground coffee and thus also to a height d of the cylindrical cake of coffee grounds compressed by brewing piston 39 in brewing cylinder 82. By means of incremental transmitter 35, 36 or some other suitable monitoring means, e.g., a slide resistor, the stroke of brewing piston 39 is monitored. If there has been wear and tear on grinder 144, the amount of coffee ground during the preset grinding time has become smaller, which can be electronically determined by a longer stroke of brewing piston 39. A signal h determined by incremental transmitter 35, 36, proportional to the actual height of the cake of coffee grounds, is supplied to control unit 143, the corresponding correction factor k being calculated, so that when the next portion of coffee is prepared, the grinding time is suitably corrected according to parameters a, b, and c and the wear and tear on the grinder determined through monitoring of the stroke.

In a further modification of the drive means for the ejection piston, two pairs of superposed pinions are each connected by a cogged V-belt, the facing sides of the belts being spaced from one another. The outer sides of the cogged V-belts mesh with racks 83 and 84 of brewing cylinder 82. The inner sides of the belts mesh with double rack 88 of ejection piston 107. In this design, the pinions are likewise held in plates 43 and 44.

The course of movement of the brewing apparatus will now be described with the aid of FIGS. 1 to 11. When nut 9 driven by gearwheel 11 is in the position shown in FIG. 7 on guideway 8 provided with external thread 93, brewing cylinder 82 is in the ground-coffee filling position, in which the portion of coffee ground by the grinder, between 6 and 15 grams, is poured into brewing cylinder 82. Inwardly projecting rotating journal parts 120 and 121 of journals 27 and 28 on sideplates 45 and 46 are then in the lower left-hand corners, as viewed in FIG. 3, of parallelogram-shaped guide grooves 47 and 48 in lateral guiding and holding plates 6 and 7. Outwardly projecting rotating parts 118 and 119 of journals 27 and 28 are, as may be seen in FIG. 2, in the forward area of lower portions 24 and 25 of grooves 20 and 21. Brewing piston 39 is in the position shown in FIG. 7.

As nut 9 moves farther down, guide journals 27 and 28 slide along lower portions 57 and 58 of guide grooves 47 and 48 toward the right, as viewed in FIG. 3, so that brewing cylinder 82 is pivoted into the brewing position shown in FIG. 8. Inwardly projecting parts 120 and 121 of journals 27 and 28 are now in the lower right-hand corners, as viewed in FIG. 3, of the parallelogram-shaped guide grooves 47 and 48. Outwardly projecting parts 118 and 119 of journals 27 and 28 are between the upper and lower portions 22, 23 and 24, 25 of guide grooves 20, 21 of guide arms 14, 15. During the further downward movement of nut 9, brewing piston 39 is pushed down into brewing cylinder 82 as far as the amount of ground coffee therein permits. Upon reaching a certain torque, when the ground coffee is compressed, the downward movement of the brewing piston is stopped, and it is moved upward again slightly to make room for the coffee swelled by the scalding water.

The brewing position of the brewing piston is monitored by incremental transmitter 35, 36 and the control unit described below. This control makes it possible to compensate for wear and tear on the grinder. The grinder is time-controlled corresponding to the desired amount of ground coffee and to any wear and tear. The brewing piston can be moved into its brewing position with an accuracy of approximately 0.25 mm. The brewed beverage is conveyed to the coffee outlet of the coffee machine through pipe 101 and tubing 102. Thereafter, nut 9 carries out an upward movement along guideway 8 again, and brewing piston 39 is pushed up. As soon as the transition locations between portions 22, 23 and 24, 25 of guide grooves 20, 21 have reached the vicinity of journals 27 and 28, the latter are moved upward along the right-hand side portions 61, 62 of guide grooves 47, 48.

Thus, ejection piston 107 is moved upward in brewing cylinder 82 and pushes the cake of coffee grounds upward. At this time, because of the described design of drive means 26, ejection piston 107 travels twice as far as drive means 26, the latter traveling the same path parallel to the axis of guide means 8 as guide arms 14 and 15. This makes it possible for the coffee machine to have less headroom. When journals 27 and 28 have reached the upper right-hand corner points of parallelogram-shaped guide grooves 47 and 48, brewing cylinder 82 pivots into the position shown in FIG. 9, the cake of coffee grounds being held back on the lower edge of guideway 8 and stripped off, then falling along extension 106 of closure plate 105 and dropping into the grounds recipient. The inner parts 120 and 121 of journals 27 and 28 have at that time traveled along upper portions 55 and 56 of guide grooves 47 and 48, outer parts 118 and 199 of journals 27 and 28 having been displaced along lower portions 24 and 25 of guide grooves 20 and 21. Lugs 71, 72 and 73, 74 of resilient groove parts 67, 68 and 69, 70, respectively, keep journals 27 and 28 from moving back in the wrong direction.

The inventive brewing apparatus is easy to clean, so that it may be fixed in the coffee machine and need be disassembled and cleaned by service personnel only during regular servicing, say, about every six months. A cleaning apparatus is preferably built into the coffee machine itself. On the other hand, the inventive brewing apparatus is constructed in such a way that it might also be designed as a removable module. The drive motor might then be mounted fast with the brewing apparatus, for example. In that case, however, the motor would have to be sealed.

The brewing apparatus is constructed symmetrically with respect to a plane parallel to lateral guiding and holding plates 6, 7, thus making possible a number of mounting variations.

What is claimed is:

1. Brewing apparatus for preparing a beverage, especially for a coffee machine, of the type having a brewing piston, a brewing cylinder containing an ejection piston, lateral guiding and holding plates including grooves for guiding said brewing cylinder and for mounting individual components of said brewing apparatus, supply means for supplying scalding water to said brewing cylinder, and discharge means for the beverage, wherein the improvement comprises:
   a guide means disposed concentrically with said brewing piston for axial guidance thereof,
   first drive means disposed concentrically with said guide means for bringing said brewing piston into a predetermined brewing position, variable with respect to said brewing cylinder,
   control elements connected to said first drive means for controlling a swivel movement of said brewing cylinder from a filling position into said brewing position, and
   a driving mechanism movable with respect to said brewing cylinder for moving said ejection piston within said brewing cylinder in such a way that said ejection piston travels a step-up geared path with respect to said driving mechanism.

2. The brewing apparatus of claim 1, wherein said guide means is at least partially cylindrical and includes an external thread.

3. The brewing apparatus of claim 1, wherein said first drive means is a nut having an internal thread and teeth on the outer periphery thereof.

4. The brewing apparatus of claim 1, wherein said control elements are bent guide arms disposed at the sides of said guide means, each of said guide arms including angled grooves, a recess in the upper region thereof for partial engagement of said first drive means, and first securing means, said brewing piston having second securing means engageable by said first securing means.

5. The brewing apparatus of claim 1, wherein said brewing piston is provided with second securing means for axial displacement thereof in said guide means.

6. The brewing apparatus of claim 1, wherein said brewing cylinder is provided on one side thereof with driving and securing arms for pivotingly mounting said brewing cylinder between said lateral guiding and holding plates, said driving and securing arms co-operating with said driving mechanism.

7. The brewing apparatus of claim 6, further comprising a scalding water connection, said brewing cylinder being provided with a cover plate for protecting said scalding water connection from soiling.

8. The brewing apparatus of claim 1, wherein for moving said ejection piston in said brewing cylinder, said driving mechanism has two sideplates with journals engaging said guide grooves in said guiding and holding plates on one side, and engaging said grooves in said lateral guide arms on the other side.

9. The brewing apparatus of claim 8, wherein said driving mechanism comprises two holding plates for rotatingly mounting two rows of superposed pinions, said pinions of each row engaging one another, and the opposite pinions of said two rows being spaced from one another.

10. The brewing apparatus of claim 1, wherein said driving mechanism comprises two holding plates for rotatingly mounting two rows of superposed pinions, said pinions of each row engaging one another, and the opposite pinions of said two rows being spaced from one another.

11. The brewing apparatus of claim 1, wherein said ejection piston includes a rack on the side thereof remote from said brewing piston.

12. The brewing apparatus of claim 11, wherein said rack is provided on both sides with teeth for engaging the uppermost said pinions of said driving mechanism.

13. The brewing apparatus of claim 1, wherein said brewing cylinder comprises a top closure plate convexly curved toward said brewing piston and including an extension on one side thereof.

14. The brewing apparatus of claim 13, further comprising a scalding water connection, said brewing cylinder being provided with a cover plate for protecting said scalding water connection from soiling.

15. The brewing apparatus of claim 1, wherein said driving mechanism comprises two pairs of superposed pinions connected by cogged V-belts, said cogged V-belts engaging said teeth of said driving arms of said brewing cylinder, and said cogged V-belts forming a gap at the facing sides thereof.

16. The brewing apparatus of claim 1, wherein said grooves in said guiding and holding plates are parallelogram-shaped.

17. The brewing apparatus of claim 1, further comprising a scalding water connection, said brewing cylinder being provided with a cover plate for protecting said scalding water connection from soiling.

18. The brewing apparatus of claim 1, further comprising an intermediate container for ground coffee and closure means connected to said brewing cylinder for said intermediate container.

19. The brewing apparatus of claim 1, further comprising a scalding water connection having a valve and a plug, said brewing cylinder comprising a fitting engageable by said plug.

20. A coffee machine having brewing apparatus comprising a brewing piston, a brewing cylinder containing an ejection piston, lateral guiding and holding plates including grooves for guiding said brewing cylinder and for mounting individual components of said brewing apparatus, supply means for supplying scalding water to said brewing cylinder, and discharge means for the beverage, a guide means disposed concentrically with said brewing piston for axial guidance thereof, first drive means disposed concentrically with said guide means for bringing said brewing piston into a predetermined brewing position, variable with respect to said brewing cylinder, control elements connected to said first drive means for controlling a swivel movement of said brewing cylinder from a filling position into said brewing position, and a driving mechanism movable with respect to said brewing cylinder for moving said ejection piston within said brewing cylinder in such a way that said ejection piston travels a step-up geared path with respect to said driving mechanism.

21. The coffee machine of claim 20, wherein said brewing apparatus further comprises a motor-driven second drive means disposed parallel to the longitudinal axis of said brewing apparatus for co-operating with said first drive means of said brewing apparatus.

22. The coffee machine of claim 20, further comprising detecting means for detecting the revolutions of said first drive means of said brewing apparatus and thus for determining the position of said brewing piston.

23. The coffee machine of claim 22, further comprising a control unit for determining the grinding time of a grinder as a function of data preselected by means of input units, said control unit calculating on the basis of the stroke of said brewing piston, detected by said detection means, a correction factor for controlling said grinder.

* * * * *